United States Patent [19]

Parker

[11] 4,176,307
[45] Nov. 27, 1979

[54] ENERGY ECONOMIZING AC POWER CONTROL SYSTEM

[76] Inventor: Louis W. Parker, 2040 N. Dixie Hwy., Ft. Lauderdale, Fla. 13305

[21] Appl. No.: 906,702

[22] Filed: May 17, 1978

[51] Int. Cl.² .............................................. H02P 7/36
[52] U.S. Cl. .................................... 318/798; 318/812
[58] Field of Search ............... 318/779, 799, 809, 812, 318/798

[56] References Cited

U.S. PATENT DOCUMENTS

| | | | |
|---|---|---|---|
| 3,470,436 | 9/1969 | Steele | 318/799 |
| 4,052,651 | 10/1977 | Kamaike | 318/812 |
| 4,078,191 | 3/1978 | Morters et al. | 318/799 |

Primary Examiner—Gene Z. Rubinson
Assistant Examiner—Eugene S. Indyk
Attorney, Agent, or Firm—Pollock, Vande Sande and Priddy

[57] ABSTRACT

An induction motor has its stator winding energized from a sine wave power source through a signal-responsive wave modifier operative to control the portion of each cycle of the sine wave which is coupled from said source to the stator winding. The induction motor includes a squirrel cage rotor which carries an additional windings operative during rotation of the rotor to generate a polyphase AC voltage having an amplitude which is proportional to the load on the motor, and the AC voltage so generated is rectified to produce a DC signal which is coupled to a DC amplifier which in turn produces a control voltage for controlling the wave modifier.

8 Claims, 1 Drawing Figure

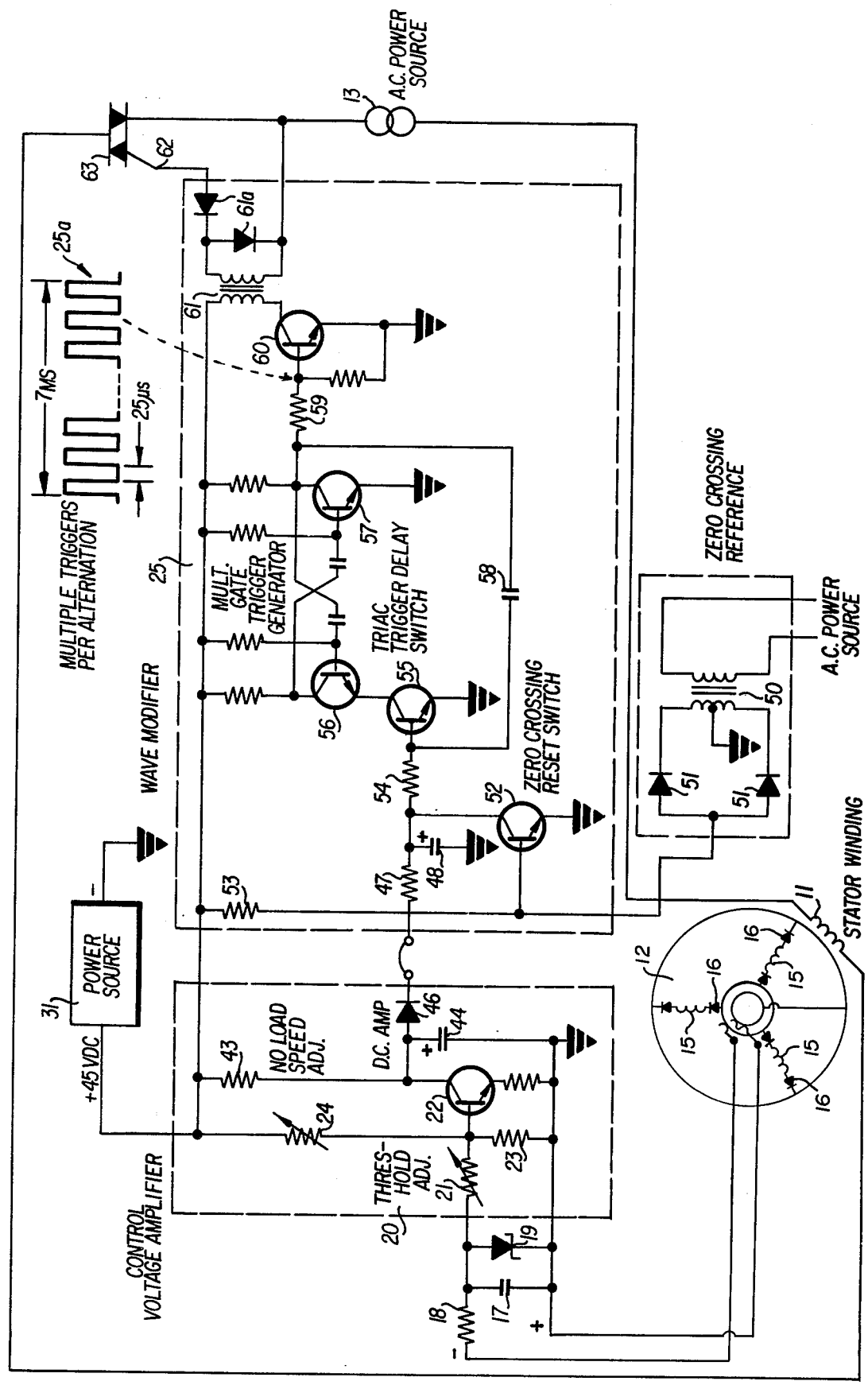

ENERGY ECONOMIZING AC POWER CONTROL SYSTEM

BACKGROUND OF THE INVENTION

Conventional induction motors maintain the full sine wave of voltage across the stator winding regardless of the load on the motor. In those cases where the load varies within wide limits, e.g., when the motor is used for hoisting operations or in machine tools such as lathes, drill presses, etc., most of the time the motor is not expending its full rated load. In such cases, the iron losses in the stator are substantially the same when the motor is operating below full rated load as in the case when the motor is operating at full rated load; and due to the low power factor in such cases, the stator current is high and the copper losses are also substantial.

When the motor is operating below its full rated load, a fraction of the sine wave of voltage would satisfy the actual load requirement imposed on the motor, and this would in turn result in considerably lower iron and copper losses and less heating of the stator. The resultant lower operating temperature would further reduce the copper losses in the motor due to lowered ohmic resistance. These factors combine to effect a significant reduction in the energy which is consumed by the induction motor, with a consequent conservation in available energy resources and a reduction in motor operating costs.

In prior copending Parker U.S. application Ser. No. 839,945, filed Oct. 6, 1977, now abandoned in favor of continuation application Ser. No. 917,698 filed June 21, 1978, for "Energy Economizer for Induction Motors" a system is described which accomplishes the foregoing purposes by reducing energy losses when less than full rated load is applied to the induction motor. In the system described in said prior application, the induction motor is a standard AC induction motor having a stator winding which is energized from a sine wave power source through wave modifier means operative to vary the portion of each cycle of said sine wave which is coupled from the source to the stator winding, under the control of a control signal which is provided by load detecting means taking the form of a gear-tooth generator that is mechanically coupled to the shaft of the induction motor and which operates to provide a control signal that varies with variations in the load on the motor. The signal which is generated by said separate AC generator has a frequency which varies with variations in the load on the motor, and said frequency variations are converted to amplitude variations by supplying the signal to a frequency discriminator. The output signal from the frequency discriminator then controls wave modifier means comprising a normally inoperative pulse generator, such as a multivibrator, that is rendered operative to produce a train of pulses during a portion of each cycle from the sine wave energization source, the time duration during which the pulse generator is operative to produce output pulses being dependent upon the load on the motor. The pulse train, when generated, controls the closure of a full wave solid state power switch, such as a Triac assembly, disposed between the sine wave power source and the motor stator winding, so that the portion of each sine wave which is coupled to the motor stator winding, and accordingly the field density of the stator, varies with variations in the load on the motor.

The present invention is intended to accomplish results similar to those described above, without using a separate gear-tooth generator and an associated frequency discriminator.

SUMMARY OF THE INVENTION

The main purpose of the present invention is to reduce the energy losses when less than full rated load is applied to an induction motor. The system is similar to that described in the aforementioned prior Parker U.S. application Ser. No. 839,945, but generates a control voltage for controlling the wave modifier by a different and somewhat more simplified arrangement.

In accordance with the present invention, an induction motor has a rotor which is of conventional squirrel cage configuration and comprises a plurality of shorted winding, and the rotor also comprises additional unshorted winding means thereon which, during rotation of the rotor, generates polyphase AC voltage whose magnitude is proportional to the slip of the motor. The AC voltage so generated in said additional rotor winding is rectified and smoothed by a filter, and the resultant DC signal is then coupled to a control voltage amplifier the output of which is in turn fed to a wave modifier which operates to control the conduction time of a solid state switch, e.g., a Triac assembly, disposed between a sine wave power source and the stator winding of the motor.

The overall system controls the energization of the stator winding during a limited range of motor speeds near the full speed of the motor. The wave modifier means is operative to apply full sine waves of voltage from the power source to the stator winding during rotational start-up and speed build-up of the motor and, as the motor approaches full speed, then operates to vary the electrical angle of each cycle of the power source which is actually coupled to the stator winding to provide varying fractions of each sine wave of voltage from the power source to the stator winding in accordance with the energy requirements imposed on the motor by the rotor load at any given moment. The system thus functions to substantially reduce the iron and copper losses of the induction motor by causing the average current supplied from the power source to the stator winding to be supplied primarily as a function of the load on the motor as said load varies.

BRIEF DESCRIPTION OF THE DRAWINGS

The foregoing objects, advantages, construction and operation of the present invention will become more readily apparent from the following description and accompanying drawing, which is a schematic diagram of a preferred circuit of the energy economizing system of the present invention.

DESCRIPTION OF THE PREFERRED EMBODIMENTS

Referring to the accompanying drawing, an induction motor 10 is provided with a stator winding 11 and a squirrel cage rotor 12 consisting of a plurality of shorted windings. Only a single stator winding 11 is illustrated in the drawing inasmuch as the drawing is intended to depict a single phase motor, but it will be understood that in the case of a three-phase motor a plurality of stator windings would normally be provided which are interconnected to one another in conventional "Y" or delta configuration.

In addition to having the aforementioned shorted windings, the squirrel cage rotor 12 also carries additional unshorted windings 15 thereon. Windings 15, which may be of the same configuration without regard to whether the motor is a single phase or three phase motor, are wound on the squirrel cage rotor 12 where their output will be greatly reduced due to the short circuited winding in close proximity thereto, but during rotation of the rotor there will still be some voltage induced in windings 15 since the short circuited windings themselves must have a voltage of some magnitude induced in them in order to function. Windings 15 are provided with a sufficient number of turns so that when the slip of the motor is low, e.g., 1%, there will still be an adequate voltage generated in windings 15 to permit the operation to be discussed hereinafter.

Alternating current is supplied from source 13 to stator coils 11 through Triac 63. This Triac is regulated by a control voltage applied to its control element to permit more or less of the AC voltage cycle to pass through it. The control voltage for effecting this control originates in coils 15. The potential developed in coils 15 has the same frequency as is in the shorted windings of rotor 12; in other words when the motor 10 is initially energized, the potential in coils 15 has a frequency which is the same as the power line frequency, but as soon as rotation of rotor 12 begins, this frequency drops. This drop may be down to one cycle per second or less. The magnitude of the voltage developed in coils 15 also drops nearly in the same proportion.

The AC output voltage provided by coils 15 is rectified by rectifiers 16, and smoothed by a filter comprising resistor 18 and capacitor 17. The resultant negative DC voltage is fed to a control voltage amplifier 20. More particularly, the DC voltage provided by filter 17, 18 is limited to about 5 volts by zener diode 19 and is applied to the base of transistor 22 through a threshold adjustment resistor 21 and a shunt resistor 23. By the proper adjustment of control 21, the negative voltage so supplied to the base of transistor 22 is kept low enough to prevent passage of current through the transistor 22 when the motor speed is low. As the speed of motor 10 increases, and the magnitude of the negative voltage from coils 15 decreases, the positive voltage at the base of transistor 22 increases due to its connection, through adjustable control 24, to the positive side of a DC power supply 31, and the potential from the collector of transistor 22 to ground accordingly decreases.

The purpose of transistor 22 is to amplify load induced changes in the voltage of coils 15, and also to lower the voltage fed to a wave modifier 25, comprising part of a closed loop positive feedback control means operative to control the energization of stator winding 11 from power source 13, when the motor RPM is high. This results in cutting off part of the sine wave of voltage from AC source 13 which is supplied to the motor stator winding 11. The operation and the exact circuit of the wave modifier 25 is described in the aforementioned U.S. patent application Ser. No. 839,945. However, to facilitate the understanding of the present invention, the operation of the wave modifier 25 will now be described.

As shown in the drawing, the output of control voltage amplifier 20 is developed across a capacitor 44, and is fed to wave modifier 25 through a diode 46 and resistor 47 to a further capacitor 48. Diode 46 prevents capacitor 44 from receiving any charge from the wave modifier circuit 25.

A transformer 50 (whose primary winding may, for example, be coupled to a tap on AC power source 13) supplies a low potential (e.g., 12.6 Vac.) 60 cycle voltage to full wave rectifiers 51 connected to its secondary winding. The rectifiers 51 are so poled that their outputs are in the negative direction, and these negative-going pulses are applied to the base of a transistor 52 comprising a portion of a zero crossing reset switch. The negative going pulses thus supplied to transistor 52 keep transistor 52 nonconductive for the majority of each cycle, with this condition being altered only during the zero crossings of the 60 cycle wave.

More particularly, the base of transistor 52, in addition to being supplied with the negative going alternations from rectifiers 51, is supplied with forward bias current through a resistor 53 which is connected to the positive side of DC power supply 31. This forward bias current causes collector-emitter saturation in transistor 52 during zero crossings and, during this time, the junction of resistors 47, 54 and capacitor 48 (i.e., the collector of transistor 52) is clamped to the near ground potential of approximately 0.1 vdc. After the voltage from AC source 13 passes through zero, the voltage supplied by rectifiers 51 begins falling toward a negative value of approximately −12 vdc. When the resultant voltage on the base of transistor 52 falls below approximately +0.7 vdc., collector-emitter cutoff occurs. Transistor 52 remains cut off until the voltage at its base again rises to +0.7 vdc. due to the forward bias supplied through resistor 53 and the arrival of the next zero crossing. Thus, transistor 52 is cut off most of the time during each AC power source voltage alternation, and conducts only slightly before, during, and slightly after the zero crossings of those alternations. The duration of conduction of transistor 52 is approximately 1 ms.

When transistor 52 is conductive, capacitor 48 discharges. When transistor 52 is cut off, as described above, capacitor 48 begins charging through resistor 47 toward the level of the DC control voltage which is supplied by capacitor 44. The resultant signal is supplied via resistor 54 to the base of transistor 55 to render transistor 55 conductive, but the conduction of transistor 55 is delayed in accordance with the voltage which is actually present on the positive side of capacitor 48. More particularly, transistor 55 remains nonconductive until the voltage across capacitor 48, which is coupled to the base of transistor 55 through resistor 54, reaches approximately +0.7 vdc., whereafter transistor 55 (which constitutes a trigger delay switch) begins to conduct collector-emitter current.

Transistor 55 is connected to the emitter of a transistor 56, which cooperates with a further transistor 57 and with a plurality of associated capacitors and resistors, to provide an astable (free-running) multivibrator of well-known configuration, with one exception. The exception is that, whereas the emitter of transistor 57 is directly grounded, the emitter of transistor 56 in said multivibrator is not grounded and, instead, is connected to ground through transistor 55. As a result, typical multivibrator operation of transistors 56, 57 is prevented until transistor 55 conducts to provide a conduction path to ground for the emitter of transistor 56. As soon as transistor 55 is brought to saturated conduction, typical astable multivibrator operation occurs. The starting of multiple gate trigger generator 56, 57 is accelerated by a capacitor 58 which feeds a starting pulse from the output of said generator to the base of transistor 55.

The component values of the multivibrator (or multiple gate trigger generator) 56, 57 are selected to cause multivibrator action at approximately 20 kHz. The output signal which is produced, when the multiple gate trigger generator 56, 57 is rendered operative, takes the form shown at 25a, i.e., a train of trigger pulses each of which has a width in the order of 25 microseconds occurring over a maximum time period of 7 ms. per alternation of the AC power source 13, or occurring during such lesser portion of said AC power source cycle as may be determined by the time at which transistor 55 was rendered conductive to enable operation of the multiple gate trigger generator 56, 57.

After transistor 55 is brought to saturation by the combined action of the forward bias coupled from capacitor 48 and the positive going or forward bias coupled to the base of transistor 55 via capacitor 58 from the output side of trigger generator 25, transistor 55 is maintained in this state by said combined forward biases for the remainder of the power source voltage alternations. The positive voltage pulses (25a) appearing at the output side of the multiple gate trigger generator are coupled via a resistor 59 to a gate trigger amplifier comprising a transistor 60, an associated transformer 61, and failure mode protection diodes 61a, for conversion to higher power current pulses. These higher power pulses are, in turn, supplied to the gate electrode or control terminal 62 of Triac assembly 63 connected between AC power source 13 and the stator winding 11 of induction motor 10. The protection diodes 61a prevent positive gate current flow and limit reverse gate voltage to approximately 2 v by diode clamping.

Triac assembly 63 is turned on by the arrival of the first pulse in the series of pulses coupled to its gate electrode from the gate trigger amplifier 60. The continuous stream of pulses thereafter supplied to the gate electrode of Triac assembly 63 assures full balance conduction of Triac assembly 63 regardless of voltage transients which may be produced by the varying inductive load of the motor 10 that, otherwise, might create alternation imbalance by self-commutation at times other than the current zero crossings conducted from the AC power source 13.

When power from AC source 13 is first applied via Triac assembly 63 to stator winding 11, the voltage generated in rotor coils 15 is highest, holding transistor 22 nonconducting and its collector to ground potential at its highest value. The high DC output developed across capacitor 44 causes transistor 55 to conduct without delay after each zero crossing of AC source 13, causing the multiple gate trigger generator 56, 57 to commence operation immediately, which in turn causes Triac assembly 63 to start conducting without delay. Since this operation is continuous, the Triac assembly 63 will pass current in both directions, and the stator winding 11 of motor 10 will receive full waves of 60 cycles causing the rotor 12 thereof to commence rotation.

As rotor 12 approaches full rotational speed, the output voltage from coils 15 decreases. This permits the positive potential, applied from power supply 31 through no-load speed adjuster 24, to raise the voltage at the base of transistor 22 which, in turn, lowers the voltage across capacitor 44. As a result, capacitor 48 does not have sufficient time to receive a full charge before it is discharged periodically by transistor 52. Consequently, the voltage across capacitor 48 is not sufficiently high at the beginning of the charge to immediately reach the conduction threshold of transistor 55, and to start operation of multiple gate generator 56, 57. The result is that Triac assembly 63 does not start conduction at the beginning of the voltage cycle from AC power source 13, but begins conduction later, i.e., at a time subsequent to the commencement of the sine wave cycle from power source 13. The energy which is actually delivered to the motor stator 11 by Triac assembly 63 accordingly represents only part of the sine wave of voltage from AC power source 13.

As the motor load increases, the slip of the motor 10 increases and its speed drops; and this increases the voltage across coils 15 which, in turn, results in an increase of the DC control potential charging capacitor 48, enabling transistor 55 to reach its conduction threshold sooner and starting the conduction of Triac assembly 63 nearer the beginning of the power cycle, permitting more power to reach the stator 11 of motor 10. When the load on the motor 10 decreases, the slip of the motor decreases and its speed increases; and this decreases the voltage across coils 15 and, as a result of the operations described above, decreases the operative angle of the AC wave and decreases the power which is supplied to the motor stator 11.

While I have thus described a preferred embodiment of the present invention, many variations will be apparent to those skilled in the art. Some of these variations are discussed, for example, in the aforementioned prior Parker U.S. application Ser. No. 839,945, the disclosure of which is incorporated herein by reference. For example, instead of using a Triac assembly, it may be preferable in some applications of the invention to use other forms of power switch such as a pair of silicon controlled rectifiers. It must therefore be understood that the foregoing description is intended to be illustrative only and not limitative of the present invention and all such variations and modifications as are in accordance with the principles described are meant to fall within the scope of the appended claims.

Having thus described my invention, I claim:

1. An energy economizing AC power control system operative to reduce the iron and copper losses in an induction motor, comprising an AC induction motor having a stator winding and a rotor adapted to be coupled to a load, a sine wave power source for energizing said stator winding to effect rotation of said rotor, said rotor comprising a plurality of shorted windings and also comprising unshorted additional winding means carried by said rotor, said additional winding means being operative to generate an AC voltage during rotation of said rotor having a frequency which is the same as the frequency in said shorted windings and an amplitude which is proportional to the load on said motor, and closed loop positive feedback control means operative to control the energization of said stator winding from said power source during a limited range of motor speeds near the full speed of said motor, said closed loop positive feedback means comprising rectifier means coupled to said additional winding means on said rotor for rectifying said AC signal to produce a substantially DC signal, control means responsive to said DC signal from said rectifier means for producing a control voltage which is a function of the speed of said motor, wave modifier means coupled to the output of said control means and responsive to said control voltage, said wave modifier means including switching means disposed between said sine wave power source and said stator winding, the conduction time of said switching means being controllable during each cycle from said power source as a function of the magnitude of said control voltage, said wave modifier means being operative to apply full sine waves of voltage from said power source to said stator winding during rotational start-up and speed build-up of said motor and, as said motor approaches full speed, then being operative to vary the electrical angle of each cycle of said power source which is actually coupled to said stator winding to provide varying fractions of each sine wave of voltage from said power source to said stator winding in accordance with the energy requirements imposed on said motor by the rotor load at any given moment, whereby said closed loop positive feedback control means functions to substantially reduce the iron and copper losses of said conventional motor by causing the average current supplied from said power source to said stator windings to be supplied primarily as a function of the load on said motor as the load on said motor varies.

2. The control system of claim 1 wherein said control means comprises a DC amplifier, said control voltage being a DC control voltage which varies in magnitude in inverse relation to the speed of said motor.

3. The control system of claim 2 wherein said switching means includes a Triac assembly having its input coupled to said sine wave power source and its output connected to said stator winding, and a control circuit coupled to the control terminal of said Triac assembly and responsive to the magnitude of said DC control voltage for controlling the conductivity of said Triac assembly during each cycle of said sine wave power source.

4. The control system of claim 3 wherein said control circuit comprises a trigger pulse generator operative selectively to produce a train of trigger pulses, means responsive to said DC control voltage for controlling the operation of said trigger pulse generator, and amplifier means coupling trigger pulses from the output of said trigger pulse generator to said control terminal of said Triac assembly.

5. The control system of claim 2 wherein said DC amplifier comprises a transistor, filter means between said rectifier means and an electrode of said transistor for filtering said substantially DC signal, said rectifier means being poled to apply said filtered DC signal as a negative potential to said electrode of said transistor whose magnitude varies with variations in the load on said motor, and a DC power supply for coupling a positive potential to said electrode of said transistor, whereby the conductivity of said transistor is determined by the comparative magnitudes of said negative and positive potentials applied to said electrode of said transistor.

6. The control system of claim 5 wherein said electrode is the base of said transistor.

7. The control system of claim 6 including adjustment means between said filter means and the base of said transistor for setting a threshold operative to maintain said transistor non-conductive when the speed of said motor is low.

8. The control system of claim 7 including further adjustment means for adjusting the magnitude of the positive potential which is coupled from said DC power supply to the base of said transistor.

* * * * *